Patented May 12, 1936

2,040,782

UNITED STATES PATENT OFFICE 2,040,782

MANUFACTURE OF OLEFINE OXIDES

Adrianus Johannes van Peski, Amsterdam, Netherlands, assignor to Shell Development Company, San Francisco, Calif., a corporation of Delaware No Drawing. Application November 5, 1934, Serial No. 751,579. In the Netherlands April 26, 1934

23 Claims. (Cl. 260—54)

This invention relates to a novel process for the manufacture of olefine oxides which comprises reacting an olefine with free oxygen, which oxygen may be present as oxygen per se or in admixture with other gaseous materials as steam, nitrogen, carbon dioxide, etc., said oxidation being effected in the presence of an active catalyst substantially comprising silver metal prepared by effecting the thermal decomposition of an organic silver compound.

An object of my invention is to provide a practical, economical and broadly applicable method for effecting the catalytic oxidation of olefines to the corresponding valuable olefine oxides.

The olefine oxides are valuable compounds per se as solvents, extractants, fumigants and insecticides and the like. In addition, they are valuable intermediates in the preparation of a wide variety of useful organic compounds such as alcohols, glycols, aldehydes, carboxylic acids, ethers, esters, alkylolamines, resins, polymers and the like.

Heretofore no practical method has been proposed for the production of olefine oxides by effecting the direct oxidation of the corresponding olefines. It is known that ethylene may be reacted with oxygen to obtain small amounts of ethylene oxide and large quantities of formaldehyde, and carbon oxides. Various catalysts and methods of controlling the oxidation to increase the yields of ethylene oxide have been proposed.

I have attempted to prepare ethylene oxide in accordance with the disclosed methods. These attempts were unsuccessful. Under optimum conditions of operation, in accordance with the known methods, employing as catalysts silver per se, colloidal silver and silver prepared by effecting the decomposition or reduction of inorganic silver compounds, only traces of ethylene oxide were obtained, while substantially complete oxidation of the ethylene to carbon dioxide occurred. Due to the low yields of ethylene oxide obtained and the substantially complete conversion of the ethylene to carbon dioxide, the known methods of oxidizing ethylene have failed to warrant consideration as practical processes for the technical production of ethylene oxide.

Now I have found that, in the presence of a particularly active catalyst which I prepare by effecting the thermal decomposition of an organic silver compound, I may oxidize an olefine to its corresponding olefine oxide in yields sufficiently high to render my process commercially attractive as a method for the manufacture of olefine oxides.

In the execution of my invention I preferably employ the normally gaseous or readily volatile unsaturated organic compounds such as ethylene, propylene, the butylenes, the amylenes and their homologues and suitable substitution products. I may employ the olefines severally or in mixtures containing a plurality of different species of olefines, or I may resort to the use of mixtures thereof with relatively unreactive substances. For example, mixtures of olefines and paraffins may be employed without resorting to the separation of the olefine or olefines therefrom. Such olefine-containing mixtures may be obtained by the pyrogenesis or cracking of mineral oils such as petroleum oil and shale oil, by the destructive distillation of various kinds of brown coal, by the cracking of natural carbonaceous material as petroleum products, tars, pitches, asphalts and the like.

In addition to the above-described mixtures of olefines with relatively inactive organic compounds, I may employ an olefine or olefines in admixture with inactive gases such as carbon-dioxide, hydrogen, nitrogen, steam and the like.

The successful execution of my invention is dependent on the use of active silver catalytic material which is obtained by effecting the thermal decomposition of suitable organic silver compounds. Suitable organic silver compounds, in general, are those which, on being heated, will decompose with the formation of an active and finely divided silver catalytic material. The silver salts of the carboxylic acids such as formic, acetic, propionic, butyric, isobutyric, valeric, oxalic, malic, molonic, lactic, malaic and the like are particularly suitable organic silver compounds which may be readily decomposed to catalytic silver by heating the same at temperatures at which decomposition can occur. I have found that silver oxalate is a particularly suitable organic silver compound which I may readily decompose with heat to form an active silver catalytic material. Silver oxalate is practically insoluble in water. Accordingly, it may be readily precipitated by the addition of a solution of silver nitrate to a solution of an oxalate. The suitable organic silver compounds may be decomposed in an atmosphere of hydrogen or other suitable reducing gases or decomposition may be effected in the presence of an inert gaseous substance such as nitrogen. In some cases a more efficacious catalytic material may be prepared by dissolving or suspending a suitable organic silver compound in a suitable inert liquid such as petroleum oil, hydrocarbon and the like and the mixture heated to the decomposition temperature of the silver compound in the presence or absence of hydrogen or other reducing gases.

The catalytic effect of the silver catalytic material prepared and used in accordance with my invention may be considerably enhanced by the admixture with the catalytic material of small quantities of other materials capable of acting as promoters. Suitable promoters, which may be used singly or in combination, include the metals such as copper, gold, iron, manganese, nickel, cobalt, cerium, thorium and zinc. I have found that gold and manganese are particularly effective promoters. A suitable promoter or promoters may be incorporated with the mass of silver catalyst in any suitable manner. Preferably, an intimate mixture of the organic compounds of silver and the promoter metal is effected by some suitable means as by precipitation and the same decomposed by heating.

In general, the catalytic material is quite voluminous and in a finely divided state, accordingly, the same may be advantageously employed without resorting to the use of a carrier. However, when desired, the catalytic material may be deposited upon an inert substance or carrier such as pumice, charcoal, activated carbon, silica gel and the like.

My invention is executed by reacting an olefine with free oxygen in the presence of a suitable catalyst as herein described and preferably the same is executed in the presence of a relatively inert gaseous substance which acts as a diluent such as steam, carbon dioxide, nitrogen, a paraffin hydrocarbon and the like. Such a relatively inert gaseous substance may serve primarily as a temperature diluent which serves to obviate local overheating of the catalyst due to "hot spots", to obviate excessive oxidation of the catalyst and to minimize the occurrence of undesirable side reactions resulting in the formation of excessive amounts of carbon dioxide. In general, I prefer to execute my invention in the presence of steam or other relatively inert substances which normally exist in the liquid state, since such diluents are readily separated from the normally gaseous unreacted olefines by condensation.

My process comprises effecting the controlled catalytic oxidation of an olefine to the corresponding olefine oxide by causing said olefine to react with free oxygen, which oxygen may be present as oxygen per se or in admixture with other gaseous materials as steam, nitrogen, carbon dioxide, etc., containing, for example, from 21.0% to 99.9% oxygen, or the free oxygen may be liberated or formed under the conditions of operation from substances containing oxygen in combined form.

The present invention is, in the majority of cases, executed in the vapor phase. When vapor phase methods are employed, the gaseous olefine in admixture with the desired quantity of oxygen per se or oxygen contained in a mixture or solution with other gases as in air is passed preferably continuously over the stationary catalytic material at a predetermined space velocity. In general, one mol. of oxygen reacts with two mols of a mono-olefine to form two mols of the corresponding olefine oxide. I prefer, in the majority of cases, to conduct the reaction in the presence of an excess of olefine over the stoichiometrical amount needed to combine with all of the oxygen present in the reaction space. This excess of olefine may vary within wide limits depending on the activity of the catalyst employed and on the specific operating conditions. Excellent results may usually be obtained by operating so that the reactants enter the reaction chamber in the ratio of one mol. oxygen to about 2.0 to 2.5 mols of mono-olefine. When steam and the like diluents are employed the same may be introduced into the reaction chamber separately or in admixture with the reactants.

The term "space velocity", as used herein, may be defined as the unit volume of olefine flowing through the reaction space per unit volume of catalyst, under standard conditions of temperature and pressure.

My invention is executed in a preferred temperature range of from 200° to 500° C. The use of temperatures below about 200° C. is, in the majority of cases, impractical due to the relatively slow rate of reaction even when exceedingly low space velocities are employed. The practical upper limit of the reaction temperature is set by the occurrence of pyrolytic side reactions at too high a temperature at the existing pressure. The temperature to be chosen for each specific operation is dependent on the activity of the catalyst employed, on the pressure in the reaction chamber, on the space velocity, on the stability and character of the olefine reacted, and also on the stability of the resulting product as regards cracking, polymerization and resistance against further oxidation. When it is desired to employ high space velocities, it may be of advantage to operate at temperatures near the upper limit of the allowable range. If low space velocities are employed, it may be desirable to operate at temperatures near the lower limit of the range.

The reaction of an olefine with free oxygen to form an olefine oxide is in itself endothermic. However, due to the fact that the reaction to form the olefine oxide is usually accompanied by oxidation of the olefine and/or olefine oxide to carbon dioxide, heat will be liberated in the course of the reaction. The temperature of the catalytic mass may be kept substantially constant at the predetermined desired temperature by one or combinations of the suitable methods known to the art. By a proper method of distributing the gas mixture comprising the olefine, oxygen and possibly steam, nitrogen, etc., throughout the catalyst bed, the whole may, once the reaction is initiated, be kept at a uniform temperature without the application of external heat, thus effecting a considerable economy of operation. Furthermore, the space velocity may be adjusted and the heat of reaction thereby controlled, or suitable heat exchangers may be internally or externally applied. The reaction zone may be surrounded by a selected constant boiling substance which on vaporization consumes heat liberated by the reaction and thereby maintains a substantially constant temperature of the reaction zone. To constant boiling substance, if inert, may be directly introduced into the reaction zone, from which it may be recovered and reused. In the execution of my invention, I may employ the heat liberated by the oxidation reaction to preheat, severally or in combination, the gases entering the reaction zone, thus effecting thermal economies.

My process may be executed at subatmospheric, atmospheric or superatmospheric pressure. In general, I prefer to execute the same at pressures slightly in excess of atmospheric, although it can be seen that when operating with olefines which might themselves polymerize or yield readily polymerizable or decomposable reaction products at the desired reaction temperature, it may be desirable to employ atmospheric or subatmospheric pressures.

The exit vapors from the reaction zone may be passed into a suitable condenser or fractionating column wherein the less volatile olefine oxide, water and other condensable constituents are separated from the unreacted olefine. After separation of the olefine oxide the reaction gases containing unreacted olefine may be mixed with the desired quantity of free oxygen or free oxygen containing gas and again passed over the catalyst to obtain further conversion of the olefine contained therein. The water formed in the reaction zone or introduced therein as steam, is generally liquefied with the olefine oxide, from which it may be separated by any suitable method as fractionation, stratification, use of drying agents, and the like. Any other normally liquid substance formed in the course of the reaction or introduced into the reaction mixture may be separated from the liquid olefine oxide by any suitable method known to the art.

For illustrative purposes only, reference is had to several examples which typify preferred methods of preparing suitable catalytic material and preferred modes and conditions of executing my invention.

Example I

An active finely divided silver catalyst was prepared by heating silver oxalate ($Ag_2C_2O_4$) at a temperature slightly above its decomposition temperature until substantially complete decomposition to metallic silver was effected.

An ethylene-air mixture containing from 8% to 9% ethylene was passed over the stationary silver catalytic material contained in a suitable reaction tube and heated to a temperature of about 350° C. The ethylene-air mixture was passed over the catalyst at the rate of about 88 liters per hour (measured at room temperature and atmospheric pressure) while steam was added at the rate of from 100 to 200 gm. per hour. During the run, the reaction temperature was maintained at from about 350° C. to about 400° C.

The exit vapors were condensed and the condensate containing water and ethylene oxide was fractionated for the recovery of the ethylene oxide.

About 10% of the ethylene was converted to ethylene oxide on one passage over the catalyst. The exit gases, after condensation of the ethylene oxide and water, were mixed with the desired quantity of air and again passed through the apparatus for further conversion of the ethylene.

This experiment was repeated using a colloidal silver catalyst and a catalytic silver prepared by reducing, with hydrogen, silver hydroxide precipitated on pumice stone or silica gel. With these catalysts, and employing substantially identical reaction conditions, only traces of ethylene oxide could be detected in the liquid condensate.

Example II

A very efficacious silver catalyst containing a small amount of gold which serves as a promoter was prepared as follows: the compound $$[Au(NH_3)_4](NO_3)_3$$

was prepared by reacting ammonia and ammonium nitrate with gold chloride. 200 gm. of silver nitrate and 1.6 gm. of $[Au(NH_3)_4](NO_3)_3$ were dissolved in 2 liters of water and this solution was added to a solution of 84 gm. of sodium oxalate in 3 liters of water. The precipitate, which consisted of silver oxalate and the compound $[Au(NH_3)_4](C_2O_4)NO_3$, was successively washed with alcohol and ether and the ether evaporated therefrom by exposure to the air. The precipitate was then decomposed in small portions in a porcelain crucible heated to about 300° C.

A convenient quantity of the catalytic material was placed in a suitable reaction tube inclosed in a reaction furnace and maintained at a temperature of about 350° C. About 88 liters of a gas mixture having the approximate by volume composition: 0.2% $CO_2$, 7.8% $C_2H_4$, 19.3% $O_2$, 72.7% $N_2$ and about 174 gm. of steam were passed per hour over the catalyst.

About 17.4% of the ethylene present was converted to ethylene oxide on one passage over the catalytic material. Substantially complete conversion of the ethylene to oxide was effected by repeated admixture with oxygen and passage of the mixture over the catalyst.

Example III

About 100 gm. of silver nitrate and about 1.5 gm. of copper nitrate were dissolved in one liter of water and the resulting solution added to a solution of about 41 gm. of sodium oxalate in 1.5 liters of water. The precipitate was washed, dried, decomposed by heating and subsequently brought into a suitable reaction tube.

By using this catalyst and employing substantially the same reaction conditions as described in Example II, about 12% of the ethylene present in the reaction mixture was converted to ethylene oxide on one passage over the catalytic material.

Example IV

About 100 gm. of silver nitrate and about 0.215 gm. of ferric nitrate were dissolved in 1 liter of water and the resulting solution added to a solution of about 42 gm. of silver oxalate in about 1.5 liters of water. The resulting precipitate was separated from the aqueous solution, washed, dried and decomposed by heating.

The resulting catalyst was used under substantially the same conditions as described in Example II. An average conversion of from 12% to 13% of the ethylene to ethylene oxide was effected on one passage of the gas mixture through the reaction zone.

Example V

About 100 gm. of silver nitrate and about 5 gm. of manganese nitrate were dissolved in about 500 cc. of water and the solution was added to a solution of about 42 grams of sodium oxalate in about 1.5 liters of water. The resulting precipitate was washed successively with water, alcohol and ether, then freed of ether by exposure to the air and decomposed in small portions by heating. About 48 gm. of catalytic material having an apparent volume of about 220 cc. were obtained.

A gas mixture having the approximate by volume composition: 0.4% $CO_2$, 8.4% $C_2H_4$, 18% $O_2$ and 73.2% $N_2$ was treated as follows: the gas mixture was passed over the catalyst at an average rate of about 88 liters per hour, while steam was added at an average rate of about 200 gm. per hour. The catalytic material was maintained at an average temperature of about 350° C.

About 16.9% of the ethylene was converted to ethylene oxide on one passage through the reaction zone.

My invention provides a batch, intermittent or continuous mode of operation whereby olefines may be substantially completely converted to olefine oxides.

It will be evident to those skilled in the art that the specific operating conditions such as space velocities, pressure, temperature, etc., may be varied within wide limits within the scope of my invention, depending on the relative activity of the catalyst employed, the concentrations of olefine, olefine oxide and free oxygen in the reaction mixture and on the specific olefine oxidized.

While I have in the foregoing described in some detail the preferred embodiments of my invention and some variants thereof, it will be understood that this is only for the purpose of making the invention more clear and that the invention is not to be regarded as limited to the details of operation herein described, nor is it dependent upon the soundness or accuracy of the theories which I have advanced as to the advantageous results obtained. On the other hand, the invention is to be regarded as limited only by the terms of the accompanying claims, in which it is our intension to claim all novelty inherent therein as broadly as possible in view of the prior art.

I claim as my invention:

1. A process for the production of olefine oxides which comprises reacting an olefine with oxygen in the presence of a silver catalyst obtained by effecting the thermal decomposition of silver oxalate, said reaction being effected at a temperature not substantially less than 200° C. but below the temperature at which pyrolytic side reactions are substantially favored.

2. A process for the production of olefine oxides which comprises reacting an olefine with oxygen in the presence of an activated catalyst prepared by effecting the thermal decomposition of a silver salt of an aliphatic carboxylic acid, and activated by the addition thereto of a metallic promoter essentially comprising a heavy metal, said reaction being effected at a temperature not substantially less than 200° C. but below the temperature at which pyrolytic side reactions are substantially favored.

3. A process for the production of olefine oxides which comprises reacting an olefine with oxygen in the presence of an activated catalyst prepared by effecting the thermal decomposition of a silver salt of an aliphatic carboxylic acid, and activated by the addition thereto of a heavy metal catalyst promoter of the class consisting of copper, gold, nickel, iron, cobalt, manganese, cerium, thorium and zinc, said reaction being effected at a temperature not substantially less than 200° C. but below the temperature at which pyrolytic side reactions are substantially favored.

4. A process for the production of olefine oxides which comprises reacting an olefine with oxygen in the presence of an activated catalyst prepared by effecting the thermal decomposition of an intimate mixture of a silver salt of an aliphatic carboxylic acid with a small amount of a gold compound, said reaction being effected at a temperature not substantially less than 200° C. but below the temperature at which pyrolytic side reactions are substantially favored.

5. A process for the production of olefine oxides which comprises reacting an olefine with less than the stoichiometrical amount of free oxygen in the presence of a catalyst essentially comprising silver metal obtained by effecting the thermal decomposition of a silver salt of an aliphatic carboxylic acid, said reaction being effected at a temperature not substantially less than 200° C. but below the temperature at which pyrolytic side reactions are substantially favored.

6. A process for the production of olefine oxides which comprises reacting an olefine with oxygen in the presence of a relatively inert gas, said reaction being effected in the presence of a catalyst essentially comprising silver metal obtained by effecting the thermal decomposition of a silver salt of an aliphatic carboxylic acid, said reaction being effected at a temperature not substantially less than 200° C. but below the temperature at which pyrolytic side reactions are substantially favored.

7. A process for the production of olefine oxides which comprises reacting an olefine with oxygen in the presence of steam, said reaction being effected in the presence of a catalyst essentially comprising silver metal obtained by effecting the thermal decomposition of a silver salt of an aliphatic carboxylic acid, said reaction being effected at a temperature not substantially less than 200° C. but below the temperature at which pyrolytic side reactions are substantially favored.

8. A process for the production of olefine oxides which comprises reacting an olefine with oxygen at a temperature not substantially less than 200° C. but below the temperature at which pyrolytic side reactions are substantially favored in the presence of a catalyst essentially comprising silver metal obtained by effecting the thermal decomposition of a silver salt of an aliphatic carboxylic acid.

9. A process for the production of olefine oxides which comprises reacting an olefine with oxygen at temperatures between 200° C. and 500° C. in the presence of a catalyst essentially comprising silver metal obtained by effecting the thermal decomposition of a silver salt of an aliphatic carboxylic acid.

10. A process for the production of olefine oxides which comprises reacting an olefine with oxygen in the molal ratio of at least two mols of olefine to one mol. of oxygen, in the presence of steam, at a temperature in the range of from 200° C. to 500° C. and in the presence of a catalyst essentially comprising silver metal obtained by effecting the thermal decomposition of a silver salt of an aliphatic carboxylic acid.

11. A process for the production of olefine oxides by catalytically oxidizing olefines which comprises passing an olefine-air mixture at a temperature not substantially less than 200° C. but below the temperature at which pyrolytic side reactions are substantially favored over a silver catalyst prepared by effecting the thermal decomposition of a silver salt of an aliphatic carboxylic acid.

12. A process for the production of olefine oxides by catalytically oxidizing olefines which comprises passing an olefine-air mixture containing olefine and oxygen in the ratio of at least two mols of olefine to one mol. of oxygen, in the presence of steam and at a temperature not substantially less than 200° C. but below the temperature at which pyrolytic side reactions are substantially favored, over a catalyst mass comprising silver metal obtained by effecting the thermal decomposition of a silver salt of an aliphatic carboxylic acid.

13. A process for the production of ethylene oxide which comprises reacting ethylene with oxygen in the presence of a silver catalyst prepared by effecting the thermal decomposition of a silver salt of an aliphatic carboxylic acid, said reaction being effected at a temperature not substantially less than 200° C. but below the temperature at which pyrolytic side reactions are substantially favored.

14. A process for the production of ethylene oxide which comprises reacting ethylene with oxygen in the presence of steam at a temperature not substantially less than 200° C. but below the temperature at which pyrolytic side reactions are substantially favored and in the presence of a silver catalyst prepared by effecting the thermal decomposition of a silver salt of an aliphatic carboxylic acid.

15. A process for the production of ethylene oxide which comprises reacting ethylene with oxygen in the presence of a silver catalyst obtained by effecting the thermal decomposition of silver oxalate, said reaction being effected at a temperature not substantially less than 200° C but below the temperature at which pyrolytic side reactions are substantially favored.

16. A process for the production of ethylene oxide which comprises reacting ethylene with oxygen in the presence of steam at a temperature in the range of from 200° C. to 500° C. and in the presence of a silver catalyst essentially comprising silver metal prepared by effecting the thermal decomposition of silver oxalate.

17. A process for the production of ethylene oxide by catalytically oxidizing ethylene which comprises passing an ethylene-air mixture containing ethylene and oxygen in the molal ratio of at least two mols of ethylene to one mol. of oxygen, in the presence of steam and at a temperature in the range of from 200° C. to 500° C., over a catalyst mass essentially comprising silver metal obtained by effecting the thermal decomposition of silver oxalate.

18. A process for the production of ethylene oxide which comprises reacting ethylene with oxygen in the presence of steam at a temperature in the range of from 200° C. to 500° C. and in the presence of an activated catalyst prepared by effecting the thermal decomposition of silver oxalate and activated by the addition thereto of a heavy metal catalyst promoter of the class consisting of copper, gold, nickel, iron, cobalt, manganese, cerium, thorium and zinc.

19. A process for the production of an olefine oxide which comprises reacting an olefine with oxygen in the presence of a silver metal catalyst obtained by effecting the thermal decomposition of a silver salt of an aliphatic carboxylic acid, said reaction being effected at a temperature not substantially less than 200° C. but below the temperature at which pyrolytic side reactions are substantially favored.

20. A process for the production of an olefine oxide which comprises reacting an olefine with oxygen in the presence of a relatively inert diluent material and in the presence of a silver metal catalyst obtained by effecting the thermal decomposition of a silver salt of an aliphatic carboxylic acid, said reaction being effected at a temperature not substantially less than 200° C. but below the temperature at which pyrolytic side reactions are substantially favored.

21. A process for the production of an olefine oxide which comprises contacting an olefine with less than a stoichiometrical amount of free oxygen and subjecting the mixture to a treatment, in the presence of a silver metal catalyst obtained by thermal decomposition of a silver salt of an aliphatic carboxylic acid, at a temperature of from about 200° C. to about 500° C.

22. A process for the production of ethylene oxide which comprises reacting ethylene with oxygen in the presence of steam at a temperature not substantially less than 200° C. but below the temperature at which pyrolytic side reactions are substantially favored, said reaction being catalyzed by the presence of an active catalyst prepared by effecting the thermal decomposition of an intimate mixture of a silver salt of an aliphatic carboxylic acid with a relatively smaller amount of a gold compound.

23. A process for the production of ethylene oxide which comprises reacting ethylene with oxygen in the presence of steam at a temperature not substantially less than 200° C. but below the temperature at which pyrolytic side reactions are substantially favored, said reaction being catalyzed by the presence of an active catalyst prepared by effecting the thermal decomposition of an intimate mixture of a silver salt of an aliphatic carboxylic acid with a relatively smaller amount of a manganese compound.

ADRIANUS JOHANNES van PESKI.